Dec. 10, 1935.  N. KYRIACOU  2,024,048
COMPOUND TUNNEL OR FLAME FURNACE
Filed May 2, 1933
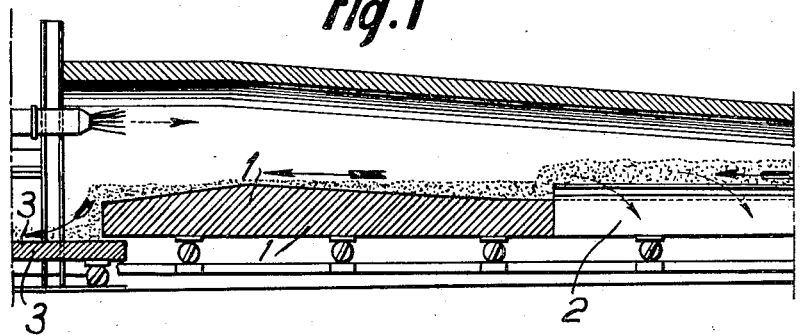
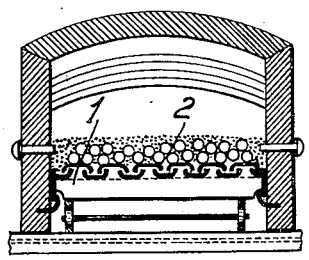
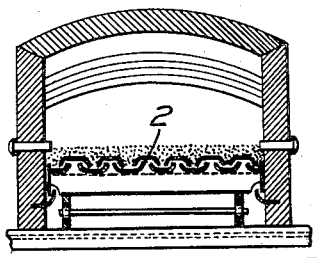
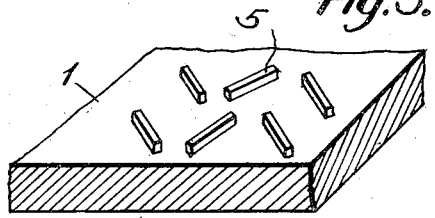
Inventor:
Nicolas C. Kyriacou
Strauch & Hoffman
Attorneys Patented Dec. 10, 1935

2,024,048

UNITED STATES PATENT OFFICE 2,024,048

COMPOUND TUNNEL OR FLAME FURNACE

Nicolas Kyriacou, Saint Germain-en-Laye, France

Application May 2, 1933, Serial No. 668,974
In France May 4, 1932

10 Claims. (Cl. 263—21)

This invention relates to furnaces or kilns and more particularly to such devices as employed in the burning of cement and like material.

Tunnel shaped shaking furnaces or furnaces with shaking hearths, wherein the material to be treated is conveyed through the furnace by a conveyor having an oscillatory motion of the pendular type, have been disclosed in prior patents. However, such devices have not been of a practical nature due to their design or other characteristics and have not been used in the industry primarily because of their low thermal efficiency arising from the high temperature of the gases discharged by the furnace.

In the metallurgical art, a recent construction has been developed which has given most satisfactory results and involves the use of a grate wherein the gases pass through the material treated from the upper to the lower part, thus giving rise to very good thermal efficiency. The magnitude of the increase of efficiency is better understood by comparison with the operation of a vertical kiln. In a vertical kiln, the height of a column required to lower the temperature of combustion gases to about 150° C. is about 33 feet or 10 meters; the same results can be obtained with a height of 10 inches or 25 centimeters, if the material to be treated is laying on a grate as the gases pass therethrough from the upper to the lower side. Principles of this type may be applied to cement practice as well as metallurgical practice. In cement manufacture, the hot gases, as from a rotary kiln, can be directed on a mechanical grate, or any other type of grate on which rests the previously ground raw material, and the gases from the kiln pass from the top to the bottom of the layer.

However, such mechanical apparatus has not been modified to obtain the best results in accordance with these principles, and devices such as the conventional rotary kiln involving a high cost of installation and insulation, high maintenance cost, flues, numerous cold air intakes, etc., thus unduly lowering the temperature of the hot gases and the overall thermal efficiency, are usually employed.

In overcoming the disadvantages above mentioned, the present invention has, as a major object, the provision of a novel furnace or kiln wherein material is subjected to a sintering process at relatively high temperature subsequent to a calcining process wherein the material is forwarded through a series of oscillations or reciprocations and is subjected to the action of hot gases passing therethrough.

A further object of the present invention is the provision of novel means for advancing material through a furnace by a series of oscillations whereby the material is subjected to the flow of hot gases passing therethrough and subsequently to the action of radiant and reflected heat.

Still a further object of this invention is the provision of a novel manner of surfacing a kiln or furnace whereby the material may be subjected to the action of radiant and reflected heat and yet be thoroughly agitated to insure uniform processing.

Another object of this invention is the provision of a novel grate, particularly for use in a furnace or kiln wherein it is desired to advance the material being treated by a series of oscillations or reciprocations and force heated gases therethrough.

This invention has, among other objects, the provision of a combination oscillating and rotary conveyor in a furnace of the type particularly adapted for cement or like materials wherein the material is forwarded by an oscillating motion and hot gases passed therethrough, and subsequently subjected to the action of reflected and radiant heat while being vigorously agitated by a rotary conveyor.

Still a further object of this invention is the provision of a novel method for burning or processing cement or the like wherein the material is subjected to the action of hot gases while in a relatively quiescent stage and is subjected to the combined action of reflected and radiant heat while being vigorously agitated.

With the above and other objects in view, which will appear as the description proceeds, reference is made to the accompanying drawing in which:

Figure 1 is a part of a longitudinal sectional elevation of a furnace or kiln according to a preferred embodiment of this invention.

Figure 2 is a transverse section through the furnace of Figure 1 showing a preferred type of grate.

Figure 3 is a view similar to that of Figure 2 showing still another preferred type of grate.

Figure 4 is a view of a preferred modified form of the grate I viewed as in Figure 1 with transverse corrugations shown thereon.

Figure 5 is a perspective of a portion of a further preferred modified form of grate with baffles thereon.

Broadly the present invention involves a furnace or kiln for burning cement or other material, the furnace comprising a single chamber in which the dehydration and calcination of the material takes place, the material being forwarded on a shaking hearth to which is imparted a pendular or reciprocatory motion and which is so constructed as to permit of the passage of hot gases through the hearth and the material deposited thereon.

In a preferred embodiment of the invention as shown in Figure 1, the grate and conveyor rides upon rollers and may be connected by a suitable speed reduction device to a variable speed electric motor arranged to give the conveyor an oscillating motion as by an eccentric or cam connection. The conveyor is preferably covered for a certain portion of its length with a refractory lining and the remaining portion is arranged as a grate. The entire system may be installed in a single tunnel furnace and the two thermal treatments, i. e., clinkerization by radiation and calcination by sintering, combined, the gases in the latter step passing through the material from the top to the bottom and through the grate.

With specific reference to Figure 1, the refractory lining on the conveyor is preferably formed of clinker concrete with transverse corrugations 4 thereon as shown in Figure 4, or with baffle plates 5 as shown in Figure 5 in order to obtain a thorough agitation by means of continued partial accumulation and dissemination of the material.

The grate 2 can be formed as a part of the first mentioned conveyor or can be formed on an independent conveyor. In the present case, the grate 2 is shown as constituting a series of steel troughs (Figure 2) arranged in alternately inverted overlapping relation with the ends thereof spaced from one another to provide longitudinal openings as gas passages substantially parallel to the longitudinal axis of the furnace.

The furnace or kiln can be heated by any kind of fuel, such as pulverized coal, crude oil, and the like; and the combustion of the fuel can be arranged to take place at any point of the furnace or the fuel can be mixed with the material to be treated prior to its introduction into the furnace.

The furnace may be provided with an additional section containing a drying grate (Figure 3) or a grate for any other purpose desired and this grate may be made a part of the entire system or may be made independent thereof. Such a grate is preferably loaded with bodies for heat accumulation such as metal balls or refractory material of suitable shape, such as cylindrical bodies with diameters substantially equal to their height. By reason of the high calorific capacity which is about 2000 times higher than the capacity of hot gases, the drying efficiency is thus rendered very high. The feeding of cement may be done on a grate of this type.

The kiln may be formed in two sections (see Figure 4), one section which rotates (1) and the other section which remains stationary (2) and contains a conveyor of the reciprocatory type. Both sections may be connected by an air tight ring, preventing the admission of cold air and the consequent reduction of the temperature of the hot gases.

A rotary kiln of a length of about 12 to 20 meters, corresponding to the length of the flame, would constitute the clinkerization section, while the stationary section of the kiln with a shaking hearth of the type described herein would constitute the tunnel furnace with shaking grate.

It is to be understood that this invention may be employed in processes involving dehydration roasting, calcination, and metallurgical treatments of any product such as lime, magnesia, chemical products and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A furnace of the tunnel type comprising an elongated chamber; a source of heat in said chamber; a conveyor of the reciprocatory type arranged to advance material toward said source of heat, a portion of said conveyor being surfaced with refractory material to receive and reflect heat; and a second portion of said conveyor having openings therein to permit the circulation of gases therethrough and through the material thereon.

2. A furnace of the tunnel type comprising an elongated chamber; a source of heat adjacent one end of said chamber; a conveyor of the reciprocatory type arranged to advance material toward said source of heat, a portion of said conveyor adjacent said source of heating being surfaced with refractory material to form a sintering hearth; and a portion of said conveyor spaced from said source of heat being provided with a grate to permit the circulation of gases therethrough and through the material thereon to effect calcination.

3. A furnace of the tunnel type comprising an elongated chamber; a source of heat adjacent one end of said chamber; a conveyor of the reciprocatory type arranged to advance material toward said source of heat; a portion of said conveyor being surfaced with refractory material; heat accumulating bodies associated with said material; and a second portion of said conveyor having openings therein to permit the circulation of gases therethrough and through the material thereon.

4. A conveyor of the tunnel type comprising an elongated chamber; a source of heat adjacent one end of said chamber; a conveyor of the reciprocatory type arranged to advance material toward said source of heat, a portion of said conveyor being surfaced with refractory material to receive and reflect heat; and a second portion of said conveyor being formed of a series of spaced troughs longitudinally disposed on said conveyor to permit the circulation of gases therethrough and through the material thereon.

5. A furnace of the tunnel type comprising an elongated chamber; a source of heat adjacent one end of said chamber; a conveyor of the reciprocatory type arranged to advance material toward said source of heat, a portion of said conveyor being surfaced with refractory material to receive and reflect heat; and a second portion of said conveyor being formed of a series of spaced troughs alternately inverted to permit the circulation of gases therethrough and through the material thereon.

6. A furnace of the tunnel type comprising an elongated chamber; a source of heat adjacent one end of said chamber; a conveyor of the reciprocatory type arranged to advance material toward said source of heat, a portion of said conveyor being surfaced with refractory material to receive and reflect heat; and a second portion of said conveyor being formed of a series of spaced troughs alternately inverted and longitudinally disposed in said chamber to provide openings to permit the circulation of gases therethrough and through the material thereon.

7. A furnace of the tunnel type comprising an elongated chamber; a source of heat therein; a conveyor of the reciprocatory type arranged to advance material toward said source of heat, a portion of said conveyor being surfaced with refractory material with means thereon to baffle and mix the material; and a second portion of said conveyor having openings therein to permit the circulation of gases therethrough and through the material thereon.

8. A furnace of the tunnel type comprising an elongated chamber; a source of heat in said chamber; a conveyor of the reciprocatory type arranged to advance material toward said source of heat, a portion of said conveyor being surfaced with refractory material to receive and reflect heat; and a second portion of said conveyor having openings therein to permit the circulation of gases therethrough and through the material thereon, said elongated chamber being designed to taper in cross section toward said second portion to facilitate the circulation of gases through the material.

9. A conveyor particularly adapted for use in a furnace comprising a substantially plane refractory surface adapted to receive and reflect heat, said refractory surface being interrupted to agitate the material conveyed thereon.

10. A conveyor particularly adapted for use in a kiln of the tunnel type comprising a substantially plane refractory surface adapted to receive and reflect heat, said refractory surface being interrupted to form corrugations substantially transverse of the longitudinal axis of said kiln.

NICOLAS KYRIACOU.